Sept. 29, 1942.    W. J. FLINTJER    2,297,294
BEET HARVESTING MACHINE
Filed Feb. 25, 1941    3 Sheets-Sheet 1
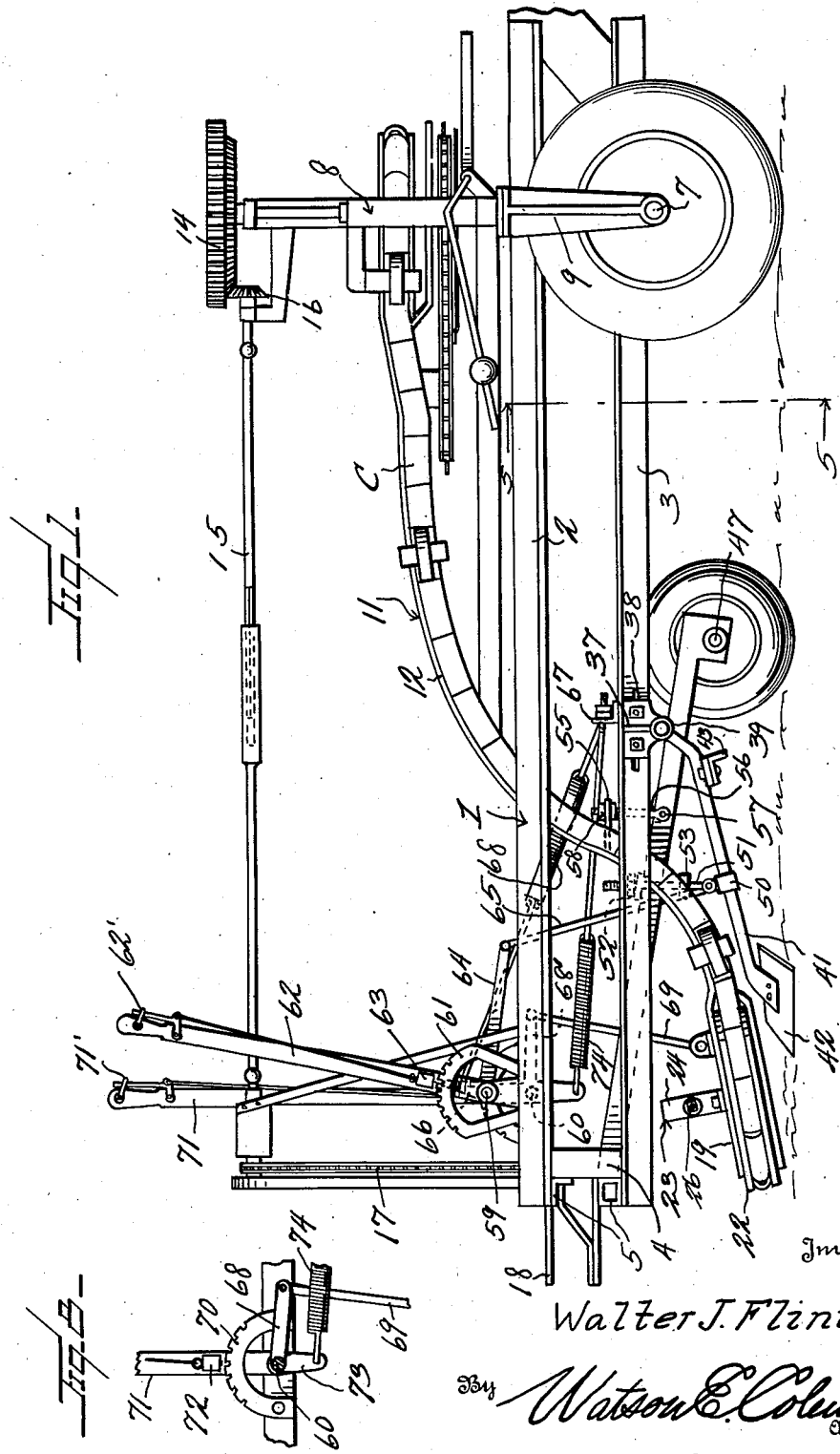
Inventor
Walter J. Flintjer
By Watson E. Coleman
Attorney

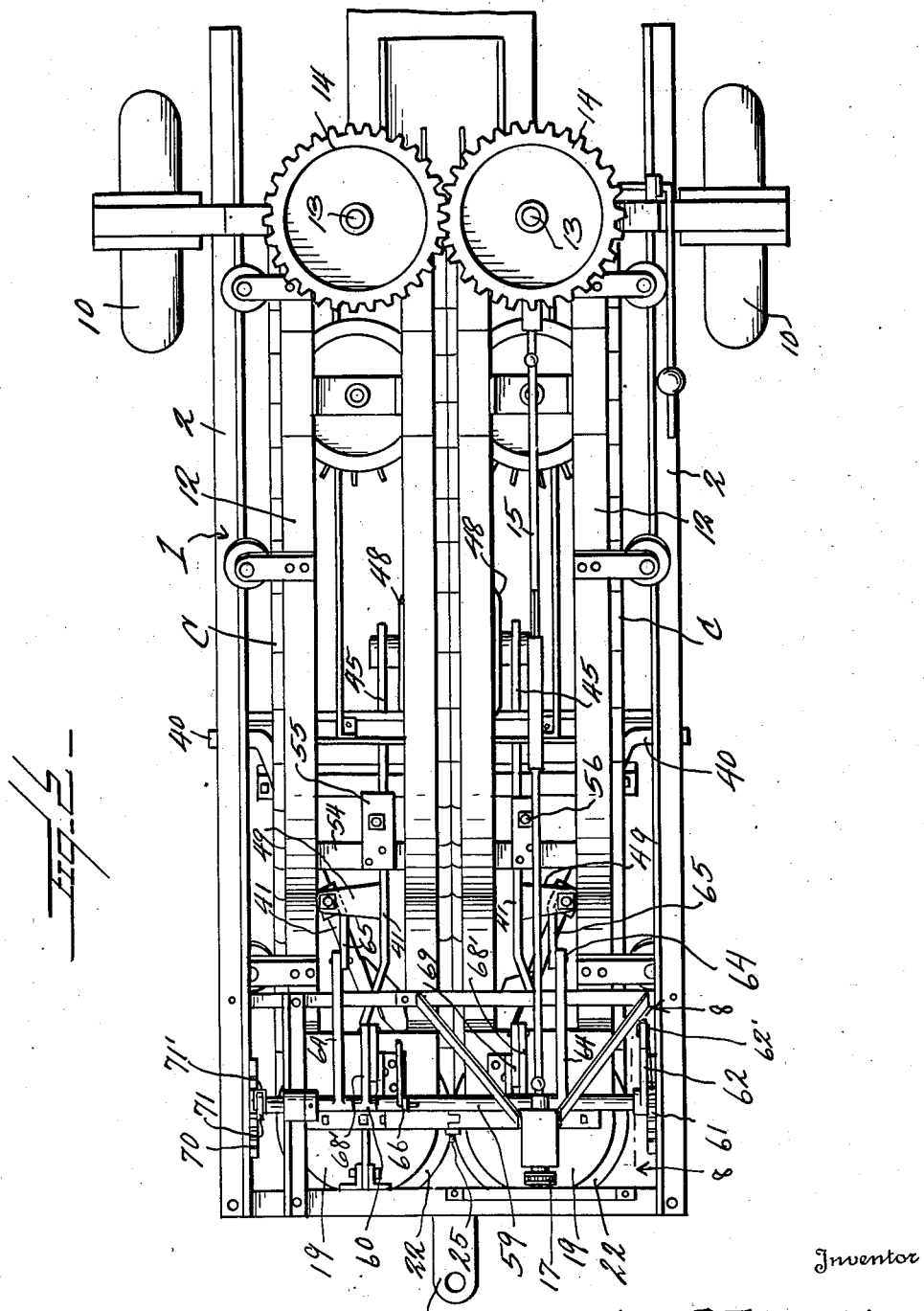

Sept. 29, 1942.  W. J. FLINTJER  2,297,294
BEET HARVESTING MACHINE
Filed Feb. 25, 1941  3 Sheets-Sheet 3
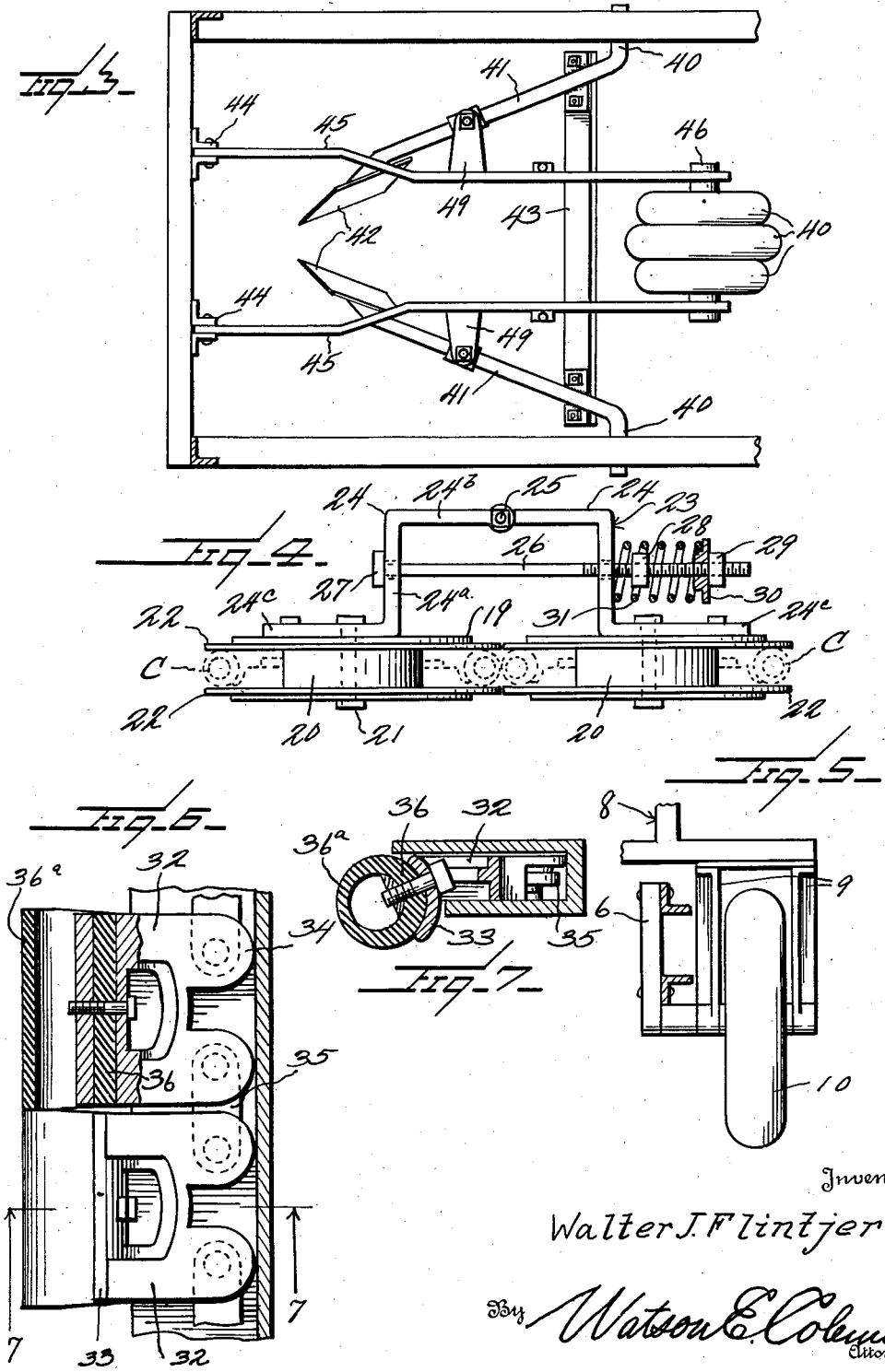
Inventor
Walter J. Flintjer
By Watson E. Coleman
Attorney Patented Sept. 29, 1942

2,297,294

UNITED STATES PATENT OFFICE 2,297,294

BEET HARVESTING MACHINE

Walter J. Flintjer, Cheyenne, Wyo.

Application February 25, 1941, Serial No. 380,549

8 Claims. (Cl. 55—108)

This invention relates to harvesting machines and pertains particularly to improvements in harvesters for sugar beets or similar vegetables.

A primary object of the present invention is to provide in a beet harvesting machine of the character herein described wherein there is employed an endless conveyor by which the beets are picked up and carried upwardly and rearwardly to a topping mechanism, a novel and improved gauge wheel supporting means for the forward end of the conveyor whereby such conveyor at its forward end will be raised and lowered in response to variations in the contour of the ground over which the machine is traveling.

Another object of the invention is to provide in a mechanism of the character stated, a novel gauge wheel supporting means for the forward end portion of an endless conveyor wherein such supporting means follows the forward end of the conveyor, thereby removing from in front of the conveyor any mechanism which may interfere with the operation of the machine by coming in contact with the beets.

Still another object of the invention is to provide in a harvesting mechanism of the character stated, a plowing unit arranged immediately in the rear of the forward end of the conveyor which, together with the conveyor is coupled for floating support with a ground supported raising and lowering mechanism, which mechanism includes a ground engaging wheel which runs in the furrow from which the beets are lifted.

A still further object of the invention is to provide a beet harvesting mechanism of the character stated, wherein is employed a conveyor structure which is made up of two endless units, wherein such endless units are supported at their rear ends for oscillation on an axis extending horizontally transversely of the machine and the units at their forward ends are coupled together in a novel manner whereby such units may have separatory movement in accordance with variations in the bulk of the material passing therebetween and gripped thereby.

The invention will be best understood from a consideration of the following detailed description taken in connection with the accompanying drawings, it being understood, however, that the invention is not to be considered as limited by the specific illustration or description but that such illustration and description constitutes a preferred embodiment of the invention.

In the drawings:

Fig. 1 is a view in side elevation of a machine constructed in accordance with the present invention.

Fig. 2 is a view in top plan of the same.

Fig. 3 is a plan view of the lower part of the frame structure showing only the plow supporting means, gauge wheels and means coupling the wheels to the frame.

Fig. 4 is a detailed view in front elevation of the forward end of the conveyor showing the yieldable connecting or coupling means between the two portions of the conveyor.

Fig. 5 is a detailed sectional view taken substantially on the line 5—5 of Fig. 1, through one side only of the machine frame and illustrating the manner in which the conveyor supporting frame and main frame are coupled together.

Fig. 6 is a detailed sectional view taken longitudinally of and through a portion of one run of a unit of the elevator showing the mounting means for the tubular grippers.

Fig. 7 is a transverse section on the line 7—7 of Fig. 6.

Fig. 8 is a detailed sectional view taken substantially on the line 8—8 of Fig. 2.

Referring now more particularly to the drawings, the numeral 1 generally designates the main frame of the harvesting machine, which frame is here shown as comprising, on each side, two vertically spaced longitudinal beams 2 and 3, which are coupled together at their forward ends by vertical units 4, the two beams forming one side of the machine being connected to those of the opposite side by the transverse front beams 5.

At the rear end of the machine each pair of side beams is coupled to an axle standard 6, the lower end of which is secured to a short or stub axle 7.

At the rear of the machine is a vertical frame, which is indicated generally by the numeral 8. The details of construction of this vertical frame are not set forth since the same are fully disclosed in my prior Patent 2,247,293, issued June 24, 1941. There is shown, however, in this application, particularly in Fig. 5, the coupling between this vertical frame 8 and an axle for the purpose of making clear the manner in which the vertical frame, which carries the hereinafter described conveyor or elevator structure, oscillates on a horizontal axis which extends transversely of the machine.

At each side of the vertical frame 8 there are secured the vertical spaced supports 9, each of which, at its lower end, is suitably formed to provide a bearing for an axle 7 and upon the axle between the supports 9 is mounted a ground engaging wheel 10 for the support of the rear of the machine. Thus it will be understood that the vertical frame 8 at each side rocks on an axle 7 and thus this frame and the frame 1 have relative rocking movement.

The frame 8 serves as a support, as previously stated, for an elevator structure which is indicated generally by the numeral 11, the details of which are also set forth in my prior application herein referred to. This elevator comprises two endless conveyor units, each of which is indicated generally by the character C, which run or operate in the elongated endless guide channels 12. At the rear end of the elevator each of the channels 12 turns or passes around a vertical shaft 13 which is rotatably supported by the frame 8 and with which is connected a suitable wheel, not shown, for carrying the rear end of a conveyor unit C around the adjacent shaft. These shafts at their upper ends carry coupled gears 14 with one of which a driving shaft 15 is connected through the medium of the pinion 16. The forward end of this driving shaft is connected at the front end of the machine by a drive 17, with a suitable power take-off coupling, not shown, by which the shaft may be connected with the power delivery unit of a draft machine.

The forward end of the present machine is not supported upon ground engaging wheels but is provided with a hitch 18 for attachment to the said draft machine whereby the latter machine supports the forward end of the harvester.

The conveyor or elevator structure curves downwardly and forwardly as illustrated in Fig. 1, and has its forward end disposed in relatively close proximity to the ground beneath the forward end of the machine frame 1. Each of the endless guides, of course, also curves downwardly and forwardly and each at its forward end is formed to provide upper and lower plates 19 between which are rotatably supported the conveyor guide wheels 20, Fig. 4, for rotation about the pivot bolts 21. Each of these conveyor unit guide wheels is provided with upper and lower spaced relatively wide flanges 22, the flanges of one wheel coming into close proximity to the flanges of the other wheel, as is shown in Fig. 4.

The forward end of the elevator structure has a floating support, as will be hereinafter more fully disclosed, and in order that the forward ends of the two units C of the conveyor or elevator structure may be properly maintained in working relation one with the other, there is provided a coupling yoke 23 which extends across the elevator and which comprises two portions 24. As shown, the portions 24 of the yoke are so shaped as to form the yoke as an arch across the longitudinal center of the elevator. This is accomplished by the provision of a vertical part 24$^a$ for each portion with an inwardly extending part 24$^b$ at its upper end and an outwardly extending part 24$^c$ at its lower end, the latter parts being secured each to a top plate 19 of a conveyor unit. The inwardly extending parts 24$^b$ are joined upon the longitudinal center of and above the elevator by a hinge coupling 25, the axis of which extends longitudinally of the conveyor.

Extending transversely of the conveyor between the parts 24$^a$ of the yoke is a rod or bolt 26, one end of which has a head 27 for holding it against movement in one direction with respect to the part 24$^a$ through which it passes while the other end, which passes through the opposite part 24$^a$, is screw-threaded to receive the movement limiting nut 28 and the spring retaining nut 29. The nut 28 upon the bolt 26 limits the separatory movement of the two portions of the yoke while the nut 29 maintains in position a disk or washer 30 against which bears one end of an expansion spring 31, the other end bearing against the adjacent side of the yoke. Thus it will be seen that the spring constantly functions to urge the lower portions of the yoke together and as a consequence constantly urges the forward ends of the two units of the elevator into contacting relation.

Each of the endless units C of the elevator structure is made up of a plurality of elongated metal carrier bodies 32 which is formed to provide along one side or one edge, a channel 33 while at its opposite edge it has the integral ears 34 which are directed oppositely from the channel. The bodies 32 are arranged in end to end relation as shown in Fig. 6, and each ear of a body is pivotally coupled with the adjacent ear of the adjacent body by a link 35.

Each of the bodies 32 has disposed in the channel 33 thereof and secured thereto, a tubular rubber body 36, the wall thickness of which is greatly reduced longitudinally through the portion lying outwardly from or remote from the channel 33, as indicated at 36$^a$. Thus the thicker part of the tubular body is secured in the channel while the outer part is relatively thin. These tubular rubber bodies are alined in end to end relation as shown in Fig. 6, to form substantially a continuous yieldable jaw which cooperates with the jaw of the other unit C along the adjacent inner runs of the units to provide a gripping means for the beet tops whereby the beets when lifted from the ground will be carried from the forward end of the elevator upwardly to the rear end thereof. By making the tubular bodies relatively thin upon the gripping sides thereof as stated, the danger of crushing off the tops of the beets is avoided while at the same time the inner sides of the tubular bodies are made sufficiently thick or heavy so that they may be clamped or otherwise firmly secured in the channel 33 of the carrier.

While the purpose of the flanges 22 is to carry the gripping tubes or gripping element carrying chains around the front ends of the guides, these flanges also perform another function. In the harvesting of beets, it is occasionally found that a beet has grown high out of the ground and if such a beet gets between the gripping tubes or gripping elements, it may cause serious trouble. With the present construction, if such a beet is encountered, the flanges on the idler wheels 20 function to smash or crush the beet, it being understood, of course, that this one beet will be lost, however, damage to the grippers will be prevented.

Rearwardly of the forward end of the elevator each of the beams 3 supports a bearing bracket 37. These brackets are maintained by suitable securing bolts which pass through longitudinal slots 38 whereby the position of the bracket may be adjusted on the beam. The bearing 39 which forms a part of the bracket is located in a plane below the adjacent beam.

In each of the bearings 39 there is mounted the angular end portion 40 of a plow beam 41. This plow beam extends forwardly and inwardly, as shown in Fig. 3, and also at a downward inclination so that it converges toward the front of the machine with the corresponding plow beam at the opposite side. Upon the forward ends of the beams 41 are mounted the plows 42 and these have their points in relatively close proximity beneath the two units of the conveyor and are just a little behind the part of the conveyor where the inner runs of the units come together. Thus it will be seen that as the top of a beet is engaged between the inner runs of the grippers of the conveyor units, the body of the beet will be loosened and lifted in the ground by the plow blades 42 which pass along the sides thereof.

The beams 41 are secured together by a crossbar 43 so that the raising and lowering of the plows will be uniform.

Upon opposite sides of the longitudinal center of the machine there are secured to one of the transverse frame bars 5, the two pairs of pivot brackets 44 and between the brackets of each pair is pivotally secured one end of a gauge wheel arm 45 which extends rearwardly through the central part of the adjacent unit of the elevator structure, as shown in Fig. 2. These arms at their rear ends carry bearings 46 for an axle 47 on which are mounted gauge wheels 48. Such wheels are here shown as being three in number and disposed in side by side relation, the center wheel being of greater diameter than the outside wheels and being designed to travel in the center of the beet row in the furrow formed by the removed beets. This construction is particularly well adapted for use in very soft earth. Under other circumstances the center wheel may be omitted, if desired, so that the other two wheels will run at opposite sides of the hill with a space between them.

Each of the gauge wheel arms 45 carries a laterally extending bracket 49 and directly beneath this bracket the adjacent plow beam has a collar 50 secured thereto to which is pivotally attached an upwardly extending threaded rod 51, which extends through an aperture in the bracket 49. Threaded on this rod 51 above and below the bracket 49 are the nuts 52 and 53, respectively. The lower nut 53 is spaced from the bracket 49, while the upper nut engages the top of the bracket. With this arrangement, it will be readily apparent that any raising or lowering of the arms 45 by the supporting wheel 40 will also raise and lower the plow beams and the plows attached thereto, as well as raising the forward end of the elevator structure. Consequently, the plows have floating support as does the elevator structure also. This arrangement, however, permits the plows to be raised manually independently of the arms 45 as will be hereinafter apparent.

Extending across the central part of each unit of the elevator is a plate 54 which carries a rearwardly extending bracket or plate 55. Each of these plates 55 has an aperture through which extends vertically a bolt or threaded rod 56 which at its lower end is pivotally attached as at 57, to the gauge wheel arm lying therebeneath. With this connection between each of the units of the elevator and an arm 45, it will be seen that since the threaded bolts or rods 56 are held securely in connection with the plates 55 by the upper and lower nuts 58, any vertical movement of the gauge wheel arms will impart corresponding movement to the front end of the elevator, the elevator rocking upon the axles 7 which at the rear of the machine support the elevator supporting frame 8.

Supported in suitable bearings, transversely of the forward end of the machine frame are the two shafts 59 and 60. The shaft 59 is here shown as the uppermost one and adjacent to it is secured a ratchet segment 61. Upon the shaft 59 adjacent the segment 61 is a lever 62 carrying a locking pawl 63 adapted for engagement with the segment 61. Connected to the shaft 59 are the two rearwardly extending arms 64, each of which is connected by a link 65 with the collar 50 of an underlying plow beam 41. By this arrangement the plow beams may be positively raised and, when the pawl 63 is released for engagement with the segment 61, held in the raised position. The shaft 59 also has connected therewith an upstanding finger 66 which is coupled to a fixed part of the frame such as the bracket 67 by a contractile spring 68. Through the action of this spring, when the pawl 63 is released, the plows will be constantly urged downwardly toward and into engagement with the ground.

The shaft 60 carries two arms 68 which extend rearwardly and each of which is connected by a link 69 with the underlying elevator unit C, as is clearly shown in Fig. 1. At the side of the machine opposite from the lever 62, there is secured, in operative relation with the shaft 60, the toothed segment 70 and adjacent this segment there is mounted on the shaft the elevator shifting lever 71 which carries a pawl 72 in position for engagement with the adjacent segment. By means of this lever 71, the forward end of the elevator may be positively raised or lowered.

The shaft 60 also carries a depending finger 73 which at its lower end is coupled with a fixed portion of the machine frame, as for example, to the bracket 67, by the contractile spring 74. This spring being connected in the manner described with the shaft 60, normally tends to oscillate the shaft in a direction to lift the forward end of the elevator and it, therefore, forms in association with the vertically movable gauge wheels and arms connected therewith, a yieldable or floating support for the forward end of the elevator structure. When the harvesting machine is connected with a draft vehicle through the medium of the coupling 18 and is being drawn along a row of beets for the harvesting of the same, the pawls of the levers 62 and 71 will be secured in retracted position by the latching rings 62' and 71'. Thus the shafts 60 and 61 will be free to oscillate and the plows will be constantly urged downwardly by the spring 68 and the forward end of the elevator together with the plows can move freely in response to changes in the contour of the ground over which the gauge wheels are passing, the gauge wheels in going over rises and depressions raising and lowering these units of the machine through the medium of the coupling bolts 51 and 56. Thus it will be seen that the elevator and plow move up and down at their forward ends, in response to variations in the ground contour, through the action of the gauge wheels, but that when the machine is to be transported from one field to another or over highways, the elevator, gauge wheels and plows may be raised well above the ground surface by means of the levers 62 and 71 and held in raised position by the engagement of the pawls 62 and 72 with their respective toothed segments.

What is claimed is:

1. In a harvesting machine of the character stated, including a horizontal frame structure and an elongated elevator structure having a raised rear end and a forward end disposed in close proximity to the ground, the said rear end being supported for rocking movement on an axis extending transversely of the frame, an arm coupled at one end with the said frame and extending rearwardly of the forward end of the elevator, a coupling between said arm and the elevator for suspension of the forward end of the elevator, and a ground engaging element connected with the other end of the arm and designed to follow the contour of the ground and raise and lower the forward end of the elevator.

2. In a harvesting machine, including a wheel supported frame structure, an elongated elevator structure having a rear raised end and a forward low end in close proximity to the ground, the elevator at its rear end being supported for oscillation on a transverse axis, a ground engaging gauge wheel disposed rearwardly of the forward end of the elevator, means coupling said wheel with the forward end of the frame in a plane above the forward end of the elevator whereby said wheel may rise and fall in response to variations in the ground contour, a coupling means between said last-mentioned means and the forward end of the elevator, and resilient means coupled between the forward end of the elevator and the said frame and normally urging said forward end of the elevator upwardly.

3. In a harvesting machine of the character described, including a wheel supported body frame, an elongated elevator structure having a raised rear end and a low forward end in close proximity to the ground, the elevator being supported at its rear end for oscillation on a transverse axis, a ground contacting gauge wheel disposed rearwardly of the forward end of the elevator, a rigid coupling means between said gauge wheel and the forward end of the frame, the coupling means being pivotally attached to the frame whereby the gauge wheel may have up and down movement, a coupling between the forward end of the elevator and said coupling means by which the forward end of the elevator is supported by the gauge wheel, plows disposed rearwardly of the forward end of the elevator, means coupling the plows with the frame whereby the plows may have up and down movement on a transversely extending axis, and a coupling means between the plows and said first coupling means.

4. In a harvesting machine of the character described including a wheel supported body frame, an elongated elevator structure having a raised rear end and a low forward end in close proximity to the ground, the elevator being supported at its rear end for oscillation on a transverse axis, a ground contacting gauge wheel disposed rearwardly of the forward end of the elevator, a rigid coupling means between said gauge wheel and the forward end of the frame, the coupling means being pivotally attached to the frame whereby the gauge wheel may have up and down movement, a coupling between the forward end of the elevator and said coupling means by which the forward end of the elevator is supported by the gauge wheel, plows disposed rearwardly of the forward end of the elevator, means coupling the plows with the frame whereby the plows may have up and down movement on a transversely extending axis, a coupling means between the plows and said first coupling means, and resilient means coupling the plows and the forward end of the elevator with the frame and normally urging the plows downwardly and urging the forward end of the elevator upwardly.

5. A beet harvesting machine, comprising an elongated body frame, a wheel support for the frame at one end thereof, a vertical frame independent of the first frame and carried by the wheel support for oscillation on a horizontal axis extending transversely of the machine, an elevator structure supported at one end in the vertical frame and extending downwardly and forwardly through the first frame, a pair of arms pivotally supported to the forward end of the first frame for oscillation on a horizontal transverse axis and extending rearwardly beyond the forward end of the elevator, a ground engaging wheel carried by said arms at their rear ends, a coupling between said arms and said elevator by which the raising of the arms and the supporting wheel therefor effects the raising of the forward end of the elevator, a lever pivotally mounted upon the first frame, a coupling between the lever and the elevator by which the latter at its forward end may be oscillated vertically, and resilient connecting means between said lever and the first frame normally urging oscillation of the lever in a direction to lift the forward end of the elevator.

6. A beet harvesting machine, comprising an elongated frame, wheel supporting means for the frame at one end, an elongated elevator extending longitudinally of the frame and having a raised rear end supported for oscillation on a horizontal axis extending transversely of the frame and a low forward end, an arm pivotally attached at one end to the forward end of the frame for oscillation vertically and extending rearwardly beyond the forward end of the elevator, a wheel support for the other end of the arm, a coupling between the arm and the elevator, a pair of plow beams each pivotally attached at one end to a side of the frame rearwardly of the forward end of the elevator for vertical oscillation on a common axis extending horizontally across the frame, said plow beams extending forwardly and downwardly in convergent relation, plows carried in spaced relation by said beams in the rear of the forward end of the elevator and below the latter, a coupling between said plow beams and said arm, and means carried by the frame and coupled with the plow beams and the elevator for selectively raising and lowering the same.

7. A beet harvesting machine, comprising an elongated frame, wheel supporting means for the frame at one end, an elongated elevator extending longitudinally of the frame and having a raised rear end supported for oscillation on a horizontal axis extending transversely of the frame and a low forward end, an arm pivotally attached at one end to the forward end of the frame for oscillation vertically and extending rearwardly beyond the forward end of the elevator, a wheel support for the other end of the arm, a coupling between the arm and the elevator, a pair of plow beams each pivotally attached at one end to a side of the frame rearwardly of the forward end of the elevator for vertical oscillation on a common axis extending horizontally across the frame, said plow beams extending forwardly and downwardly in convergent relation, plows carried in spaced relation by said beams in the rear of the forward end of the elevator and below the latter, a coupling between said plow beams and said arm, and means carried by the frame and coupled with the plow beams and the elevator for selectively raising and lowering the same, the pivotal coupling between said plow beams and the sides of said frame being shiftable longitudinally of the frame for the adjustment of the plows relative to the forward end of the elevator.

8. A beet harvesting machine, comprising an elongated frame, wheel supporting means for the frame at one end, an elongated elevator extending longitudinally of the frame and having a raised rear end supported for oscillation on a horizontal axis extending transversely of the frame and a low forward end, an arm pivotally attached at one end to the forward end of the frame for oscillation vertically and extending rearwardly beyond the forward end of the elevator, a wheel support for the other end of the arm, a coupling between the arm and the elevator, a pair of plow beams each pivotally attached at one end to a side of the frame rearwardly of the forward end of the elevator for vertical oscillation on a common axis extending horizontally across the frame, said plow beams extending forwardly and downwardly in convergent relation, plows carried in spaced relation by said beams in the rear of the forward end of the elevator and below the latter, a coupling between said plow beams and said arm, a pair of levers pivotally supported upon the frame adjacent the forward end thereof, coupling means between one lever and the plow beams for facilitating the raising and lowering of the latter, coupling means between the other lever and the forward end of the elevator for facilitating the raising and lowering of the latter, a spring connection between the first lever and a fixed part of the frame which constantly urges oscillation of the first lever in a direction to force the plow beams downwardly, and a spring connection between the second lever and a fixed portion of the frame and normally urging oscillation of the second lever in a direction to lift the forward end of the elevator.

WALTER J. FLINTJER.